(12) United States Patent
Itsuji (10) Patent No.: US 9,448,113 B2
(45) Date of Patent: Sep. 20, 2016

(54) MEASUREMENT APPARATUS, INFORMATION OBTAINING APPARATUS, AND MEASUREMENT METHOD

(71) Applicant: CANON KABUSHIKI KAISHA, Tokyo (JP)

(72) Inventor: Takeaki Itsuji, Hiratsuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/684,056

(22) Filed: Apr. 10, 2015

(65) Prior Publication Data

US 2015/0292946 A1 Oct. 15, 2015

(30) Foreign Application Priority Data

Apr. 14, 2014 (JP) .................................. 2014-083134

(51) Int. Cl.
*G01J 3/10* (2006.01)
*G01J 3/42* (2006.01)

(52) U.S. Cl.
CPC ........................................ *G01J 3/42* (2013.01)

(58) Field of Classification Search
CPC ............ G01J 3/10; G01J 3/2889; G01J 3/108
See application file for complete search history.

(56) References Cited

U.S. PATENT DOCUMENTS

2013/0146769 A1* 6/2013 Ouchi ........................ G01J 3/42
250/338.1

FOREIGN PATENT DOCUMENTS

| JP | 2007240191 A | 9/2007 |
| JP | 2013167649 A | 8/2013 |

* cited by examiner

*Primary Examiner* — David Porta
*Assistant Examiner* — Faye Boosalis
(74) *Attorney, Agent, or Firm* — Canon USA, Inc., IP Division (57) ABSTRACT

A measurement apparatus includes a terahertz wave generating unit configured to generate a terahertz wave in response to incidence of pump light thereon; a terahertz wave detecting unit configured to detect the terahertz wave in response to incidence of probe light thereon; an adjusting unit configured to adjust an optical path length difference to adjust a timing at which the terahertz wave and the probe light reach the terahertz wave detecting unit; an amount-of-change detecting unit configured to detect an amount of change in the optical path length difference; a vibration obtaining unit configured to obtain information about a magnitude of vibration of the adjusting unit; a determining unit configured to determine whether the magnitude is within a range of an allowable value; and an output unit configured to output a measurement start trigger in a case where the determining unit determines the magnitude is within the range.

13 Claims, 7 Drawing Sheets

MEASUREMENT APPARATUS, INFORMATION OBTAINING APPARATUS, AND MEASUREMENT METHOD

BACKGROUND OF THE INVENTION

1. Field of the Invention

The present invention relates to a measurement apparatus, an information obtaining apparatus, and a measurement method for measuring a time waveform of a terahertz wave by using time-domain spectroscopy.

2. Description of the Related Art

Terahertz waves typically are electromagnetic waves having components of a certain frequency band within the range of 0.03 THz to 30 THz. There is terahertz time-domain spectroscopy (THz-TDS) available as spectroscopy using such terahertz waves. This is a method in which a time waveform of a terahertz wave is obtained by detecting the terahertz wave while changing the timing at which pump light output from a light source reaches a generating unit or the timing at which probe light reaches a detecting unit. With the adjustment of the timing, the timing at which the probe light and a terahertz wave enter the detecting unit is adjusted, and the terahertz wave is measured through sampling by using the probe light.

In a measurement apparatus using the principle of the THz-TDS method (THz-TDS apparatus), it is important to reduce an influence of vibration or the like generated by an external factor, in order to accurately obtain a time waveform. Specifically, it is required to suppress the occurrence of a situation in which an external factor that acts on an optical system of the measurement apparatus causes the optical system to vibrate, and the vibration affects a time waveform to be obtained.

Japanese Patent Laid-Open No. 2007-240191 discloses a configuration in which obtainment of a time waveform is deferred for a certain period of time in a case where vibration from an apparatus placed outside a measurement apparatus is detected.

In the method disclosed in Japanese Patent Laid-Open No. 2007-240191, obtainment of a time waveform is deferred for a certain period of time even after vibration has converged in some cases. Such an unnecessary waiting time makes it difficult to shorten the period of time required to obtain a time waveform.

SUMMARY OF THE INVENTION

According to an aspect of the present invention, there is provided a measurement apparatus for measuring a terahertz wave by using time-domain spectroscopy. The measurement apparatus includes a terahertz wave generating unit configured to generate the terahertz wave in response to incidence of pump light thereon; a terahertz wave detecting unit configured to detect the terahertz wave in response to incidence of probe light thereon; an adjusting unit configured to adjust an optical path length difference, which is a difference between an optical path length of the pump light and an optical path length of the probe light, and adjust a timing at which the terahertz wave and the probe light reach the terahertz wave detecting unit; an amount-of-change detecting unit configured to detect an amount of change in the optical path length difference; a vibration obtaining unit configured to obtain information about a magnitude of vibration of the adjusting unit by using a detection result generated by the amount-of-change detecting unit in a state where the adjusting unit is stationary; a determining unit configured to determine, by using the information, whether the magnitude of the vibration of the adjusting unit is within a range of an allowable value; and an output unit configured to output a measurement start trigger in a case where the determining unit determines that the magnitude of the vibration of the adjusting unit is within the range of the allowable value.

Further aspects of the present invention will become apparent from the following description of exemplary embodiments with reference to the attached drawings.

DESCRIPTION OF THE EMBODIMENTS

Hereinafter, embodiments will be described with reference to the drawings. Measurement apparatuses according to the embodiments have a configuration for detecting vibration generated by an external factor (external force) propagating to the measurement apparatus, and starting measurement of a terahertz wave when the vibration converges to be within an allowable range. In the description given below, such vibration may be simply referred to as "vibration of the apparatus" for convenience.

First Embodiment

Figure 1:
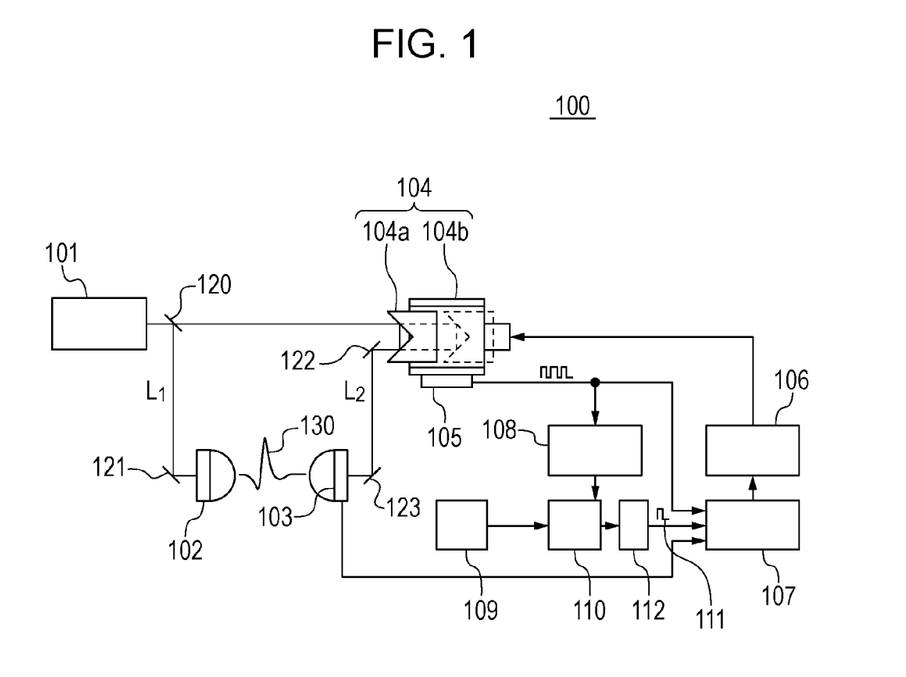
FIG. 1 is a diagram for describing the configuration of a measurement apparatus according to a first embodiment.

FIG. 1 is a diagram for describing the configuration of a measurement apparatus 100 (hereafter referred to as an apparatus 100) according to a first embodiment. The apparatus 100 measures a time waveform of a terahertz wave pulse 130 (hereinafter referred to as a terahertz wave 130) by using terahertz time-domain spectroscopy (THz-TDS). To obtain a time waveform, the apparatus 100 includes at least a light source 101, a terahertz wave generating unit 102 (hereinafter referred to as a generating unit 102), a terahertz wave detecting unit 103 (hereinafter referred to as a detecting unit 103), an adjusting unit 104, an amount-of-change detecting unit 105 (hereinafter referred to as a detecting unit 105), a driving unit 106, and a waveform constructing unit 107.

The light source 101 outputs light that is to be used to generate and detect a terahertz wave. The light output from the light source 101 is pulsed laser. The light is branched by a beam splitter 120, which serves as a branching unit, into pump light $L_1$ that enters the generating unit 102 and probe light $L_2$ that enters the detecting unit 103. As illustrated in FIG. 1, the pump light $L_1$ enters the generating unit 120 from the beam splitter 120 via a mirror 121. The probe light $L_2$ enters the detecting unit 103 from the beam splitter 120 via the adjusting unit 104 and mirrors 122 and 123. The configuration of the apparatus 100 is not limited to the above-described configuration. A light source that outputs pump light and a light source that outputs probe light may be separately provided.

The generating unit 102 generates the terahertz wave 130 in response to incidence of the pump light $L_1$ thereon. The detecting unit 103 detects an instantaneous value of an electric-field strength of the terahertz wave 130 that reaches the detecting unit 103 in response to incidence of the terahertz wave 130 and the probe light $L_2$ thereon. In this embodiment, the terahertz wave 130 enters the detecting unit 103 from the opposite side of the probe light $L_2$. Alternatively, the terahertz wave 130 may enter the detecting unit 103 from the same side as the probe light $L_2$.

The adjusting unit 104 adjusts a time difference between the probe light $L_2$ and the terahertz light 130 that reach the detecting unit 103. Specifically, the adjusting unit 104 changes an optical path length difference, which is a difference between an optical path length (propagation length) of the pump light $L_1$ that reaches the generating unit 102 from the beam splitter 120 and an optical path length of the probe light $L_2$ that reaches the detecting unit 103 from the beam splitter 120. In other words, the adjusting unit 104 changes a relative optical path length difference between the pump light $L_1$ and the probe light $L_2$.

Accordingly, the optical path length of the pump light $L_1$ and the terahertz wave 130 changes relative to the optical path length of the probe light $L_2$, and thus the timings at which the probe light $L_2$ and the terahertz wave 130 reach the detecting unit 103 change. This enables the terahertz wave 130 to be measured through sampling by using the probe light $L_2$, and a time waveform of the terahertz wave 130 can be obtained.

The adjusting unit 104 includes at least an optical device 104a (hereinafter referred to as a device 104a) and a moving unit (stage) 104b. The device 104a reflects light incident thereon. The stage 104b is a moving unit that moves along the optical axis of light incident thereon. Specifically, the stage 104b moves the device 104a along the direction in which the light is reflected. The adjusting unit 104 moves the device 104a along the optical axis of the probe light $L_2$ by using the stage 104b, and thereby changes the optical path length of the probe light $L_2$. As a result, the time at which the probe light $L_2$ reaches the detecting unit 103 becomes variable.

The configuration of the adjusting unit 104 is not limited to the above-described configuration. The adjusting unit 104 may be provided between the beam splitter 120 and the generating unit 102, and may change the optical path length of the pump light $L_1$. The stage 104b of the adjusting unit 104 may be rotatable. The adjusting unit 104 may be constituted by a fiber that propagates light and an actuator that extends and contracts the fiber. There is a method for adjusting an effective optical path length by changing the time constant of the length of the optical path along which light propagates. The adjusting unit 104 may have any configuration as long as it is capable of changing a relative optical path length difference between the pump light $L_1$ and the probe light $L_2$. In the following description, the device 104a and the stage 104b are used as the adjusting unit 104.

The driving unit 106 is a controller that controls the velocity, acceleration, deceleration, and so forth of a movement of the stage 104b during measurement of a time waveform. The detecting unit 105 detects an amount of change in the relative optical path length difference between the pump light $L_1$ and the probe light $L_2$ adjusted by the adjusting unit 104. In this embodiment, the detecting unit 105 detects, regarding the device 104a that directly affects the optical path length of the probe light $L_2$, an amount of movement in the optical axis direction of the probe light $L_2$, and the amount of movement is regarded as an amount of change in the optical path length difference. An encoder provided on the stage 104b, an encoder provided in an outer portion of the adjusting unit 104, or the like may be used as the detecting unit 105. The type of the encoder is not specified as long as the encoder is capable of eventually detecting a movement of the device 104b, for example, an optical encoder, an electric encoder, or a mechanic encoder may be used.

If the device 104a is fixed to the stage 104b, a force generated by vibration of the device 104a propagates to the stage 104b. As a result, a movement of the device 104a can be indirectly detected through a movement of the stage 104b detected by the detecting unit 105. In this embodiment, the detecting unit 105 outputs a digital signal, such as a transistor-transistor logic (TTL) signal, for each predetermined amount of movement (hereinafter referred to as a unit amount of movement). The detecting unit 105 may be a sensor or the like provided on a path along which the adjusting unit 104 moves. For example, the detecting unit 105 may output a signal every time the adjusting unit 104 moves by a unit amount of movement.

The waveform constructing unit 107 is an arithmetic processing unit, and constructs a time waveform of the terahertz wave 130 that reaches the detecting unit 103 with reference to the output of the detecting unit 103 and the detecting unit 105. Also, the waveform constructing unit 107 sets a movement distance, movement velocity, acceleration, deceleration, and so forth of the stage 104b. In response to an instruction from the waveform constructing unit 107, the driving unit 106 controls the stage 104b. Construction of a time waveform is performed by, for example, plotting the output of the detecting unit 103 for each unit amount of movement of the adjusting unit 104, and converting the amount of movement of the stage 104b into a time.

The above-described configurations of the individual units of the apparatus 100 are not limited as long as a time waveform the terahertz wave 130 can be eventually obtained. Japanese Patent Laid-Open No. 2013-167649 describes the details of the configurations of the individual units, for example.

The configuration described below is the part different from the configuration according to the related art. The apparatus 100 includes a vibration obtaining unit 108 (hereinafter referred to as an obtaining unit 108), a reference unit 109, a determining unit 110, and an output unit 112. The obtaining unit 108 obtains information about the magnitude of vibration of the adjusting unit 104 with reference to the amount of movement of the adjusting unit 104 (the amount of change in the optical path length difference) detected by the detecting unit 105 in a state where the movement of the adjusting unit 104 is stopped. Specifically, the obtaining unit 108 obtains information about the magnitude of vibration of the device 104a by using the amount of movement (the amount of change) of the device 104a detected by the detecting unit 105.

In this specification, "the movement of the adjusting unit 104 is stopped" means a state where the driving unit 106 does not output an instruction to move the stage 104b of the adjusting unit 104 or a state where the driving unit 106 performs control so that the stage 104b does not move. Even in a state where the driving unit 106 makes the adjusting unit 104 stationary, if the apparatus 100 is vibrating, the position of the adjusting unit 104 may be slightly changed accordingly because the adjusting unit 104 is also vibrating. The obtaining unit 108 obtains information about the magnitude of the vibration.

In this specification, "information about the magnitude of vibration" represents a change in an amount of adjustment of an optical path length difference adjusted by the adjusting unit 104 in a case where the amount of adjustment is changed by vibration. When attention is focused on the stage 104b, "information about the magnitude of vibration" represents a change in the position of the stage 104b caused by vibration in a case where the position is changed. Although the details will be described below, the information may represent, for example, the total amount of change per unit time (hereinafter "unit time" is referred to as "monitoring time 213") from the position where the adjusting unit 104 is stopped, or an average value and standard deviation of the amount of change per monitoring time 213. Alternatively, a waveform of vibration may be obtained by processing a detection result generated by the detecting unit 105.

The reference unit 109 outputs an allowable value 212 of an amount of change (amount of movement) of the position of the device 104a in a case where the position of the device 104a is fluctuating due to vibration. The allowable value 212 represents an allowable range of the magnitude of vibration that affects an obtained time waveform.

The determining unit 110 compares information obtained by the obtaining unit 108 in a state where the stage 104b is stationary with the allowable value 212, and determines whether or not the magnitude of vibration of the device 104a is within the range of the allowable value 212. If the determining unit 110 determines that the magnitude of vibration of the device 104a is within the range of the allowable value 212, the output unit 112 outputs a measurement start trigger 111 (hereinafter referred to as a trigger 111). The apparatus 100 starts obtaining a time waveform of a terahertz wave after the waveform constructing unit 107 receives the trigger 111.

The apparatus 100 includes a computer provided with a central processing unit (CPU), a memory, a storage device, and so forth (not illustrated). The CPU has the functions of the waveform constructing unit 107, the obtaining unit 108, the reference unit 109, the determining unit 110, and the output unit 112. Alternatively, the waveform constructing unit 107, the obtaining unit 108, the reference unit 109, the determining unit 110, and the output unit 112 may be constituted by the same arithmetic processor, or may be constituted by independent arithmetic processors.

The operation of the obtaining unit 108 will be described. Here, the device 104a and the stage 104b are used as the adjusting unit 104. An amount of change in an optical path length difference adjusted by the adjusting unit 104 may be expressed as an amount of movement of the device 104a or the stage 104b.

Figure 2A:
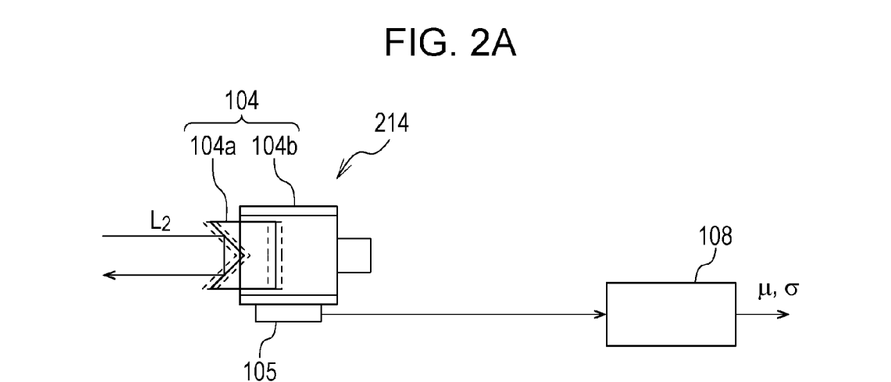
FIG. 2A is a diagram for describing an adjusting unit in a stationary state according to the first embodiment.

In FIG. 2A, it is assumed that the stage 104b of the adjusting unit 104 is stationary. That is, the apparatus 100 is in a waiting state, the stage 104b is not being moved by the driving unit 106, and obtainment of a time waveform of a terahertz wave is not being performed. In the following description, this position is referred to as a reference position and is expressed as an amount of movement zero. As illustrated in FIG. 2A, the position of the device 104a of the adjusting unit 104 may be slightly changed by an external force 214 relative to the reference position with the amount of movement zero.

The external force 214 has a force that acts on the device 104a via a component constituting the apparatus 100, or a force that directly acts on the device 104a. Examples of the former force may be a force generated by a structure that moves, such as the stage 104b, vibration generated by various devices for driving the apparatus 100, sound generated inside or outside the apparatus 100, vibration generated in accordance with a movement of a person who performs measurement, and vibration of an entire building in which the apparatus 100 is installed. An example of the latter force may be vibration of air, such as sound.

Figure 2B:
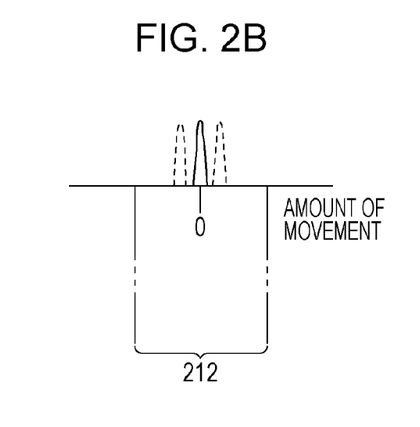
FIG. 2B is a diagram for describing an amount of change in propagation distance of probe light caused by vibration according to the first embodiment.

If the device 104a is vibrated or moved by the external force 214 applied thereto, the propagation distance of the probe light $L_2$ that reaches the detecting unit 103 via the adjusting unit 104 slightly changes. Accordingly, the timing at which the probe light $L_2$ reaches the detecting unit 103 slightly changes. In FIG. 2B, an amount of change in the propagation distance of the probe light $L_2$ caused by vibration of the device 104a with respect to the propagation distance of the probe light $L_2$ in a case where the stage 104b is not vibrating and is stationary at the reference position (the position of the amount of movement zero) is expressed as an amount of movement of the device 104a. As described above, the amount of movement of the device 104a corresponds to the amount of change in the adjustment value of the adjusting unit 104.

If a time waveform of a terahertz wave is obtained while the device 104a is vibrating, the vibration of the device 104a may have an influence on the constructed time waveform. In this embodiment, to suppress such an influence of vibration, measurement of a time waveform is deferred until an amount of movement of the device 104a relative to the reference position becomes within the range of the allowable value 212. If the amount of movement is within the range of the allowable value 212, measurement of a time waveform is started.

The allowable value 212 is determined in the following manner. In the THz-TDS apparatus, a time waveform of the terahertz wave 130 is obtained by detecting the terahertz wave 130 while changing the timing at which the terahertz wave 130 and the probe light $L_2$ enter the detecting unit 103. Typically, the detection is performed at a certain sampling interval, and the sampling interval is determined in accordance with an amount of movement of the stage 104b. The upper limit of the allowable value 212 is set to an amount of movement A of the stage 104b that at least does not exceed an amount of movement of the adjusting unit 104 corresponding to the sampling interval.

The sampling interval corresponds to time resolution of a time waveform of a terahertz wave. In many cases, the amount of movement of the stage 104b corresponding to the sampling interval is set to several µm. Thus, the amount of movement A is of this order.

In addition, an amount of movement B of the stage 104b in a state where the stage 104b is stationary and the external force 214 applied to the device 104a is in a force free state may be regarded as a lower limit of the allowable value 212. Alternatively, the positioning accuracy of the stage 104b or the minimum amount of movement detectable by the detecting unit 105 (detecting resolution) may be set as a lower limit of the allowable value 212. This is an order of tens to hundreds of nm in many cases. Of course, in a case where the amount of movement B of the device 104a in a force free state is larger than these values, the lower limit of the allowable value 212 is adjusted accordingly.

As the upper limit of the allowable value 212 decreases, the magnitude of vibration at which obtainment of a time waveform is started decreases. Thus, an influence of vibration on a constructed time waveform decreases, and the measurement accuracy increases. That is, the allowable value 212 is set between the amount of movement A and the amount of movement B of the stage 104b, and the allowable value 212 can be selected and set by a person who performs measurement in accordance with necessary measurement accuracy. In this embodiment, an amount of movement of the adjusting unit 104 is used as an amount of change, and thus the allowable value 212 is set based on the amount of movement of the adjusting unit 104. Alternatively, the allowable value 212 may be converted to an amount of adjustment of an optical path length difference adjusted by the adjusting unit 104.

Figure 2C:
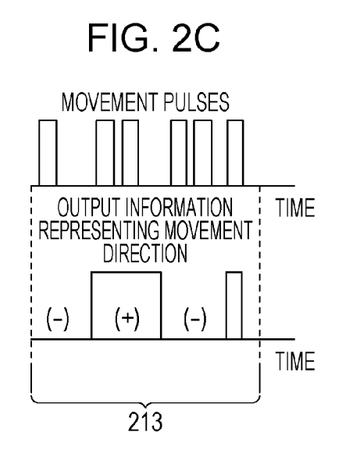
FIG. 2C illustrates an example of movement pulses output from a detecting unit according to the first embodiment.

The device 104a may be slightly vibrated by the external force 214 that acts on the device 104a, even in a state where the stage 104b is stationary. As a result, the detecting unit 105 detects displacement of the device 104a even in a state where the stage 104b is stationary. FIG. 2C illustrates an example of movement pulses output from the detecting unit 105. As illustrated in the upper part of FIG. 2C, the detecting unit 105 outputs a movement pulse for each unit amount of movement when detecting a movement of the device 104a. As a result of calculating the total number of movement pulses, the obtaining unit 108 is able to know the total amount of movement of the device 104a.

The detecting resolution of the detecting unit 105 depends on the property of an encoder used as the detecting unit 105. The detecting resolution of the detecting unit 105 is set to be equal to or smaller than the amount of movement of the stage 104b, at least not exceeding the amount of movement corresponding to the sampling interval. In addition, the detecting resolution of the detecting unit 105 is at least equal to or smaller than the upper limit of the allowable value 212, that is, the amount of movement A, and has a value with which the amount of movement B of the stage 104b in a state where the external force 214 that acts on the device 104a of the apparatus 100 is in a force free state is detectable.

As illustrated in the lower part of FIG. 2C, the detecting unit 105 may output information representing a movement direction of the device 104a, in addition to the movement pulses. The obtaining unit 108 is able to know an amount of relative displacement (hereinafter referred to as a movement distance) with respect to the reference position of the amount of movement zero (the stop position of the stage 104b) on the basis of the number of movement pulses and the movement direction of the device 104a.

The obtaining unit 108 obtains information about the magnitude of vibration of the adjusting unit 104 by using the amount of movement detected by the detecting unit 105 per monitoring time 213 that is predetermined by a person who performs measurement or the apparatus 100. Here, information representing the total amount of movement or the movement distance of the adjusting unit 104 is obtained as information about the magnitude of vibration. Detection of the amount of movement is performed n times from a monitoring time $t_0$ to a monitoring time $t_n$.

Figure 2D:
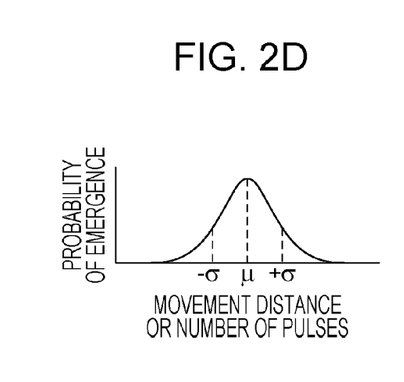
FIG. 2D is a diagram for describing processing performed by a vibration obtaining unit according to the first embodiment.

FIG. 2D is a diagram for describing processing performed by the obtaining unit 108. The amounts of movement detected n times from the monitoring time $t_0$ to the monitoring time $t_n$ are subjected to statistical processing in the obtaining unit 108. Specifically, as in FIG. 2D, the amounts of movement measured in the individual monitoring times 213 are subjected to statistical processing, and thereby an average value $\mu$ and a standard deviation $\sigma$ are obtained as information about the magnitude of vibration.

In FIG. 2D, the horizontal axis represents the movement distance of the device 104a or the total number of pulses output by the detecting unit 105 during the monitoring times 213. The number of pulses may be converted into the total amount of movement of the stage 104b in the monitoring times 213. The vertical axis represents the emergence probability of the movement distance or the number of pulses. The obtaining unit 108 according to this embodiment performs statistical processing by using the amounts of movement monitored in the plurality of monitoring times 213. Alternatively, the obtaining unit 108 may directly output the amounts of movement monitored in the individual monitoring times 213.

In FIG. 1, the determining unit 110 compares the allowable value 212 output from the reference unit 109 with the average value $\mu$ or standard deviation $\sigma$, or both the average value $\mu$ and standard deviation $\sigma$ (for example, $\mu+\sigma$) of the amount of movement output from the obtaining unit 108, and determines whether or not the magnitude of vibration is within the range of the allowable value 212. If the determining unit 110 determines that the output of the obtaining unit 108 is within the range of the allowable value 212, the trigger 111 is output. As the standard deviation $\sigma$ compared by the determining unit 110, the value of $2\sigma$ or $3\sigma$ may be used in accordance with necessary measurement accuracy. In a case where the output of the obtaining unit 108 is the amount of movement read in each monitoring time 213, the determining unit 110 compares the directly read amount of movement with the allowable value 212.

With the above-described configuration, the apparatus 100 monitors whether or not the device 104a is vibrating, and starts obtaining a time waveform of a terahertz wave pulse when the magnitude of the vibration becomes within the allowable range. As a result, unnecessary waiting time can be shortened, and thus acquisition of measurement accuracy and shortening of measurement time can be easily realized.

Figure 3:
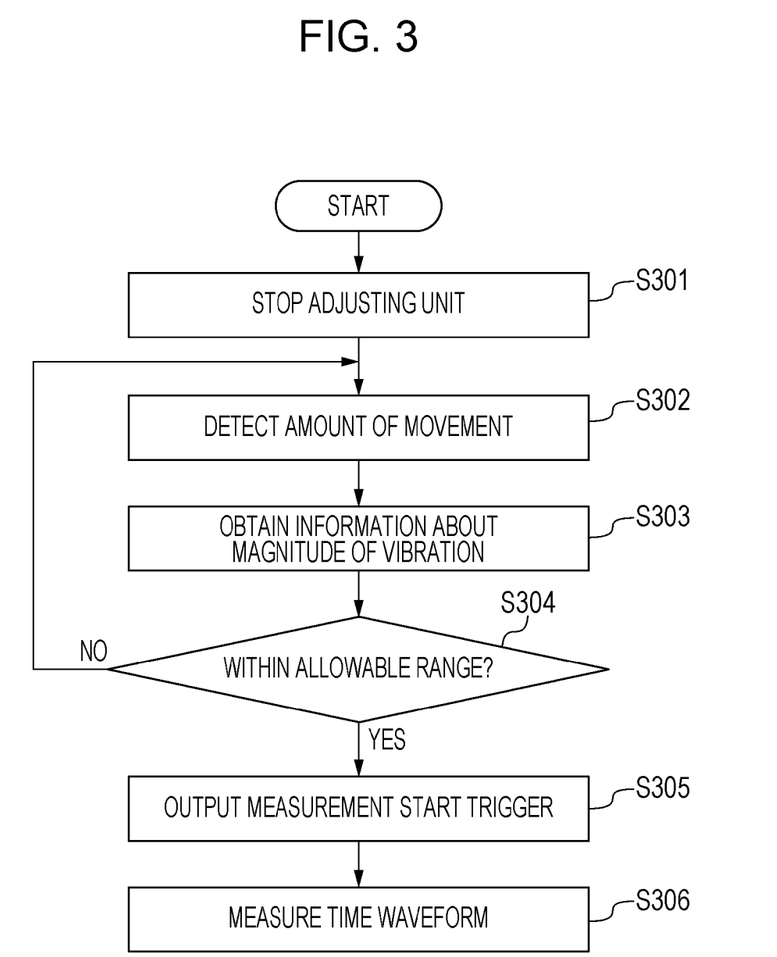
FIG. 3 is a flowchart for describing an operation of the measurement apparatus according to the first embodiment.

FIG. 3 is a flowchart for describing the operation of the apparatus 100. A program corresponding to the flowchart in FIG. 3 is stored in a memory (not illustrated) of the apparatus 100. The CPU reads the program and executes it, and thereby individual processes are performed.

The driving unit 106 stops the adjusting unit 104 before starting obtainment of a time waveform. For example, the driving unit 106 stops the stage 104b of the adjusting unit 104 (S301). Subsequently, in a state where the adjusting unit 104 is stationary, the detecting unit 105 detects an amount of movement serving as an amount of change in the optical path length difference adjusted by the adjusting unit 104 (S302). Subsequently, the obtaining unit 108 obtains information about the magnitude of vibration of the adjusting unit 104 generated by the external force 214 (S303). In this embodiment, an average value $\mu$ and a standard deviation $\sigma$ of the amount of movement are output. At this time, a plurality of monitoring times 213 may be provided, and pieces of information about the magnitude of vibration (amounts of movement) of the adjusting unit 104 detected in the plurality of monitoring times 213 may be statistically processed. As a result, a vibration state of the device 104a can be statistically determined and monitored.

Subsequently, the determining unit 110 compares the output of the obtaining unit 108 with the allowable value 212 set by the reference unit 109, and determines whether or not the magnitude of vibration is within the allowable range (S304). If the output of the obtaining unit 108 is out of the range of the allowable value 212, the process returns to step S302, where the detecting unit 105 detects an amount of movement of the adjusting unit 104 again. If the determining unit 110 determines that the output of the obtaining unit 108 is within the range of the allowable value 212, the output unit 112 outputs the trigger 111 to start obtainment of a time waveform (S305).

In response to the trigger 111, the apparatus 100 starts measuring a time waveform of a terahertz wave pulse (step S306). Specifically, the detecting unit 103 starts detection of a terahertz wave, and the waveform constructing unit 107 constructs a time waveform of the terahertz wave by using a detection result generated by the detecting unit 103.

With this method, the apparatus 100 monitors whether or not the device 104a of the apparatus 100 is vibrating, and obtains a time waveform of a terahertz wave pulse when the magnitude of the vibration becomes within the allowable range. Thus, an unnecessary waiting time can be shortened compared to the case of waiting for a certain period after vibration has been detected. According to the related art, obtainment of a time waveform may be started even if vibration continues after the certain period has elapsed. In contrast, in this embodiment, the occurrence of such a phenomenon can be suppressed. Thus, a decrease in accuracy of a time waveform caused by vibration can be easily suppressed, and also the period of time required to obtain a time waveform can be easily shortened.

Second Embodiment

A second embodiment is a modification example of the first embodiment, and further includes a configuration for suppressing an influence of the external force 214 generated during measurement of a time waveform. A description of the same parts as those described above is omitted.

Figure 4A:
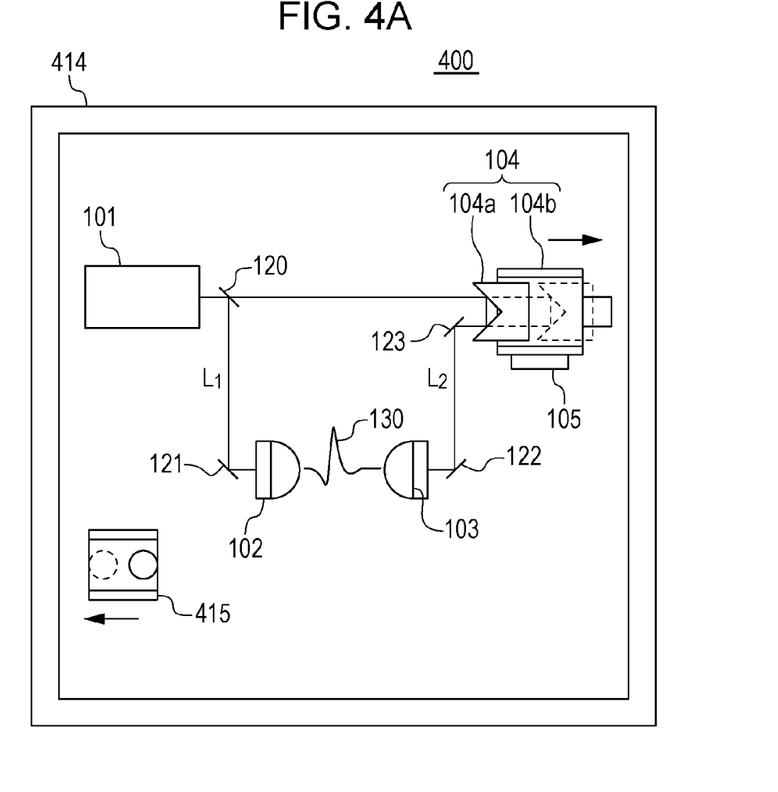
FIG. 4A is a diagram for describing the configuration of a measurement apparatus according to a second embodiment.

FIG. 4A is a diagram for describing the configuration of a measurement apparatus 400 (hereinafter referred to as an apparatus 400) according to this embodiment. The same components as those in the first embodiment are denoted by the same reference numerals. In FIG. 4A, the driving unit 106, the waveform constructing unit 107, the obtaining unit 108, the reference unit 109, the determining unit 110, and the output unit 112 are not illustrated, but the apparatus 400 includes these units. As illustrated in FIG. 4A, the apparatus 400 is disposed on an installation stand 414, and includes a vibration applying unit 415. The vibration applying unit 415 is constituted by, for example, a stage on which a weight is mounted.

The vibration applying unit 415 refers to a control signal output from the driving unit 106 that moves the adjusting unit 104 and moves in synchronization with a movement of the stage 104b at the time of obtaining a time waveform. Specifically, the vibration applying unit 415 moves in synchronization with acceleration and deceleration of the stage 104b, and thereby applies a force in the direction of cancelling out a force generated in accordance with a movement, particularly acceleration and deceleration of the stage 104b of the adjusting unit 104. As a result, propagation of a force generated by a movement of the stage 104b to the apparatus 400 is suppressed, and vibration of the device 104a is suppressed.

The vibration applying unit 415 may be disposed at a position where the vibration applying unit 415 is able to suppress vibration of the entire apparatus 400. For example, as illustrated in FIG. 4A, the vibration applying unit 415 may be disposed such that the vibration applying unit 415 and the adjusting unit 104 which is as a source of vibration are point-symmetric with respect to almost the center of the installation stand 414. As a result, vibration of the adjusting unit 104 that propagates through the installation stand 414 and vibration generated by the vibration applying unit 415 are overlapped each other and cancel out each other, and accordingly generation of an external force caused by a movement of the adjusting unit 104 is suppressed.

Figure 4B:
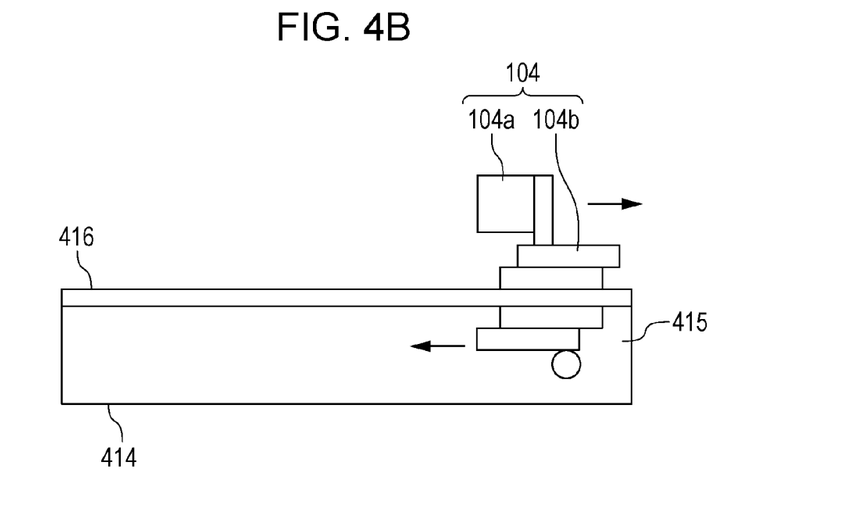
FIG. 4B is a diagram for describing an example of disposition of a vibration applying unit in the measurement apparatus according to the second embodiment.

As illustrated in FIG. 4B, the adjusting unit 104 and the vibration applying unit 415 may be disposed so as to face each other via an installation surface 416 of the installation stand 414. The vibration applying unit 415 is disposed inside the installation stand 414. In this case, vibration generated by the adjusting unit 104 can be controlled before the vibration propagates through the entire apparatus 400, and thus the vibration can be suppressed more easily.

The apparatus 400 having the above-described configuration monitors whether or not the device 104a is vibrating, and obtains a time waveform of a terahertz wave pulse when the magnitude of the vibration becomes within the allowable range. Thus, an unnecessary waiting time can be shortened compared to the case of waiting for a certain period after vibration has been detected. According to the related art, obtainment of a time waveform may be started even if vibration continues after the certain period has elapsed. In contrast, in this embodiment, the occurrence of such a phenomenon can be suppressed. Thus, a decrease in accuracy of a time waveform caused by vibration can be easily suppressed, and also the period of time required to obtain a time waveform can be easily shortened.

Furthermore, the vibration applying unit 415 is provided, which applies a force for cancelling out a force generated in accordance with a movement of the stage 104b of the adjusting unit 104 at the time of obtaining a time waveform, and thereby a force generated in accordance with the movement of the stage 104b and propagating through the apparatus 400 is suppressed, and vibration of the device 104a is suppressed. Accordingly, the period of time until when the vibration of the device 104a converges to be within the range of an allowable value can be shortened.

Third Embodiment

A third embodiment is a modification example of the first embodiment, and further includes a configuration for suppressing an influence of the external force 214 that is generated at the time of measuring a time waveform. A description of the same parts as those described above is omitted.

Figure 5:
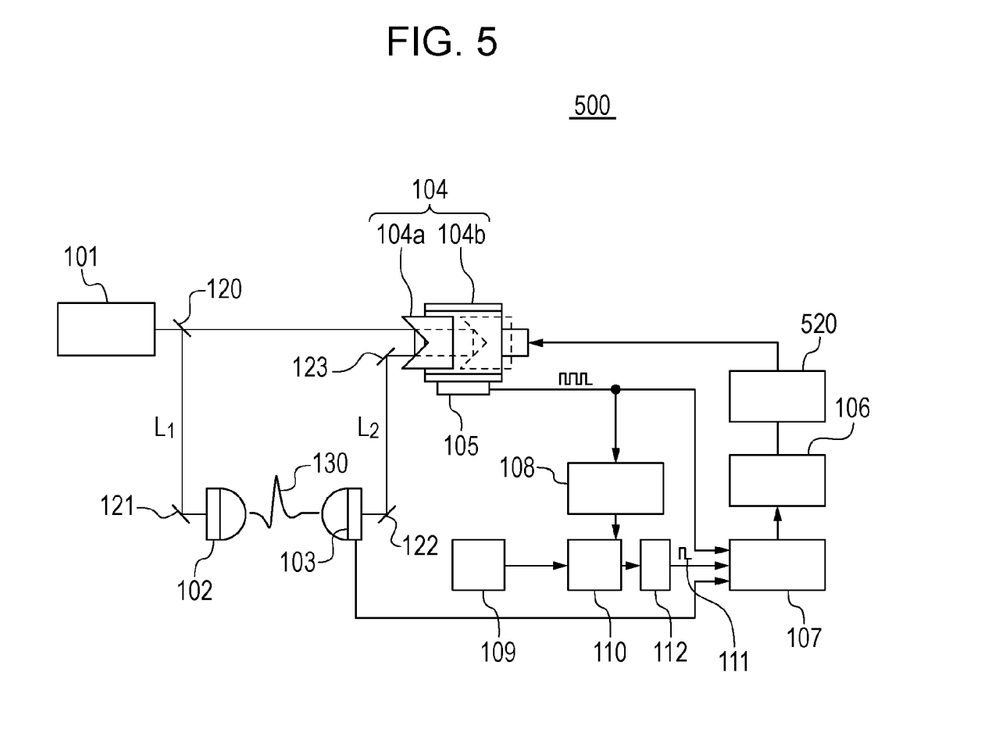
FIG. 5 is a diagram for describing the configuration of a measurement apparatus according to a third embodiment.

FIG. 5 is a diagram for describing the configuration of a measurement apparatus 500 (hereinafter referred to as an apparatus 500) according to this embodiment. The apparatus 500 includes a modulating unit 520 that suppresses an influence of the external force 214. The modulating unit 520 is connected to the driving unit 106 that controls a movement of the stage 104b, and modulates at least one of a velocity, acceleration, and deceleration of a movement of the stage 104b.

Figure 6:
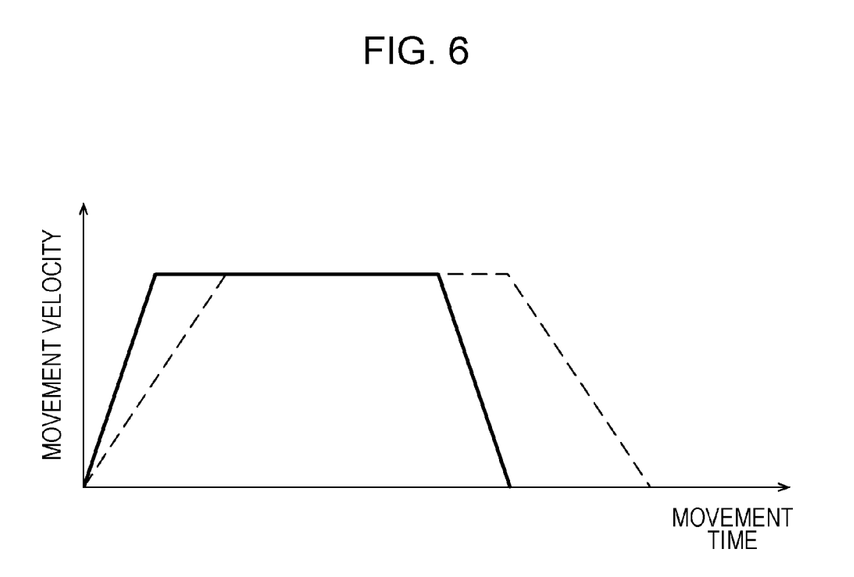
FIG. 6 is a diagram for describing an operation of a modulating unit according to the third embodiment.

FIG. 6 is a diagram for describing an operation of the stage 104b modulated by the modulating unit 520. The horizontal axis represents the movement time of the adjusting unit 104. Specifically, the horizontal axis represents the elapsed time following the start of movement of the stage 104b constituting the adjusting unit 104. The vertical axis represents the movement velocity of the adjusting unit 104. Specifically, the vertical axis represents the movement velocity of the stage 104b. Here, an example is illustrated in which the acceleration and deceleration of the stage 104b are modulated by the modulating unit 520.

In FIG. 6, a solid line represents the movement of the stage 104b in a case where the magnitude of vibration of the device 104a is small, and a broken line represents the movement of the stage 104b in a case where the magnitude of vibration of the device 104a is large. Here, an example is illustrated in which the acceleration and deceleration of the stage 104b are decreased in a case where the magnitude of vibration of the device 104a is large.

When the acceleration and deceleration change, the phase of a force added from the stage 104b also changes. Accordingly, in the case of obtaining a time waveform a plurality of times, the phase of a force from the stage 104b generated in accordance with obtainment of the individual time waveforms is changed and overlapped. As a result, resonance of the apparatus 500 at a specific frequency can be suppressed.

The magnitude of vibration of the device 104a may be determined with reference to the output of the obtaining unit 108. For example, a look-up table defining the acceleration and deceleration corresponding to an amount of movement output from the obtaining unit 108 may be prepared, and the acceleration and deceleration of the stage 104b may be determined in accordance with the look-up table. Alternatively, the velocity, acceleration, and deceleration of a movement of the stage 140b may be randomly changed every time a time waveform is obtained, without referring to the output of the obtaining unit 108.

In FIG. 6, the acceleration and deceleration of the stage 104b are decreased in a case where the magnitude of vibration of the device 104a is large, but the acceleration and deceleration may be increased. That is, it is sufficient that the acceleration and deceleration of the stage 104b are changed in accordance with the magnitude of vibration of the device 104a of the adjusting unit 104, and vibration that propagates through the entire apparatus 500 is suppressed. In FIG. 6, there is a region where the velocity of the stage 104b is constant, but the velocity may be changed.

The apparatus 500 having the above-described configuration monitors whether or not the device 104a is vibrating, monitors the magnitude of the vibration, and obtains a time waveform of a terahertz wave pulse when the magnitude of the vibration becomes within the allowable range. Thus, an unnecessary waiting time can be shortened compared to the case of waiting for a certain period after vibration has been detected. According to the related art, obtainment of a time waveform may be started even if vibration continues after the certain period has elapsed. In contrast, in this embodiment, the occurrence of such a phenomenon can be suppressed. Thus, a decrease in accuracy of a time waveform caused by vibration can be easily suppressed, and also the period of time required to obtain a time waveform can be easily shortened.

Furthermore, the apparatus 500 modulates at least one of a velocity, acceleration, and deceleration of a movement of the stage 104b of the adjusting unit 104. As a result, the phase of vibration generated in accordance with a movement of the stage 104b can be shifted and resonance of the apparatus 500 can be suppressed. Accordingly, the period of time until the vibration of the device 104a converges can be shortened, and the period of time to obtain a time waveform can be easily shortened.

Fourth Embodiment

Figure 7:
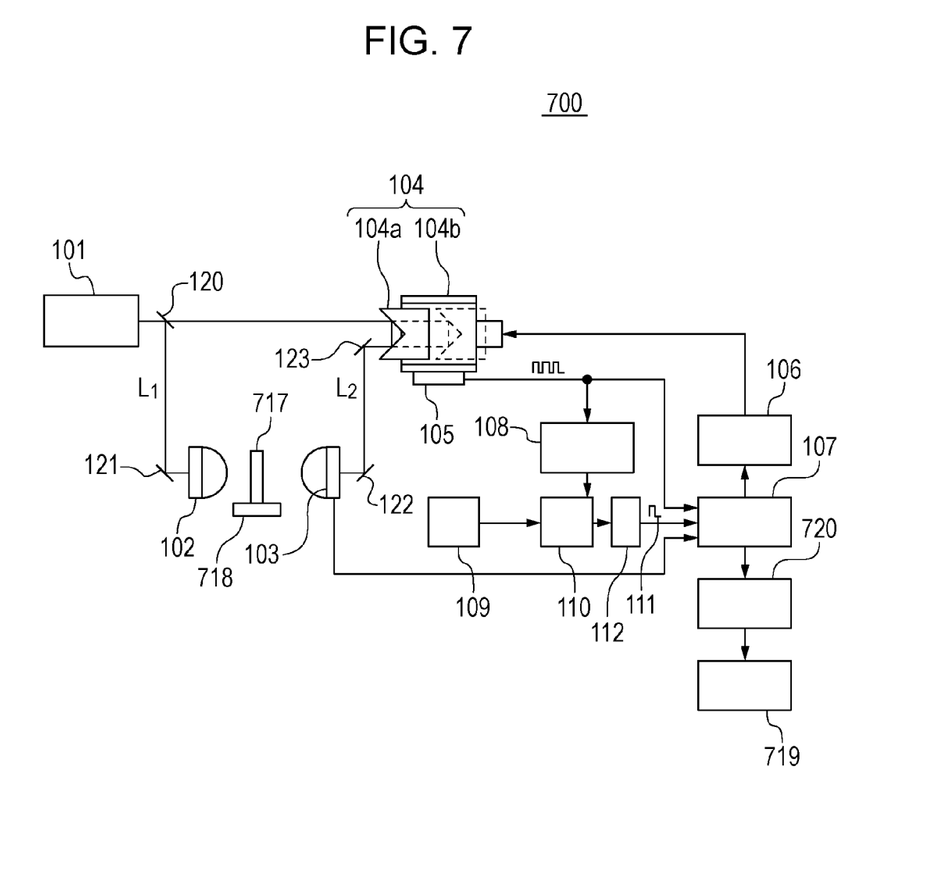
FIG. 7 is a diagram for describing the configuration of an image obtaining apparatus according to a fourth embodiment.

A fourth embodiment relates to an image obtaining apparatus. A description of the same parts as those described above is omitted. FIG. 7 is a diagram for describing the configuration of an image obtaining apparatus 700 (hereinafter referred to as an apparatus 700) according to this embodiment. The apparatus 700 obtains information about a specimen 717 by using a terahertz wave, and obtains an image of the terahertz wave. The apparatus 700 includes a changing unit 718, an image forming unit 719, and an information obtaining unit 720, in addition to the components of the apparatus 100 according to the first embodiment.

The changing unit 718 adjusts the relative positions of the specimen 717 and a terahertz wave that reaches the specimen 717, and changes an irradiation position of the specimen 717 irradiated with the terahertz wave. The position information obtained by the changing unit 718 is transmitted to the image forming unit 719.

In this embodiment, the detecting unit 103 is disposed at a position where the detecting unit 103 detects a terahertz wave transmitted through the specimen 717. Alternatively, the detecting unit 103 may detect a terahertz wave reflected by the specimen 717.

The information obtaining unit 720 obtains information about the specimen 717 by using a measurement result generated by the apparatus 100. Specifically, the information obtaining unit 720 obtains information about the specimen 717 by using time waveforms of terahertz waves obtained for individual irradiation positions of the terahertz waves. In this specification, "information about a specimen" includes at least one of a spectrum obtained from a time waveform, the physical property of the specimen, and the shape of the specimen.

"Spectrum" is a spectrum of optical characteristics in which the horizontal axis represents the frequency, and includes an amplitude spectrum and a phase spectrum of a terahertz wave obtained by performing Fourier transform on a time waveform. If a reference is obtained in advance, an intensity spectrum, a reflectivity spectrum, a refractive index spectrum, a permittivity spectrum, a complex reflectivity spectrum, a complex refractive index spectrum, a complex permittivity spectrum, a complex conductivity spectrum, and the like can be obtained, which are included in information about a specimen. The "physical property" of a specimen includes the complex amplitude reflectivity, complex refractive index, complex permittivity, reflectivity, refractive index, absorption coefficient, permittivity, and electrical conductivity of the specimen.

The shape of a specimen includes an outer shape of the specimen, the shape of an object in the specimen, and the thickness of a layer in the specimen. The shape of an object in the specimen and the thickness of a layer in the specimen can be obtained by using a difference between a time when a time waveform of a terahertz wave reflected by a certain interface in the specimen is detected and a time when a time waveform of a terahertz wave reflected by a permeable member or another interface is detected.

The image forming unit 719 forms an image by using position information representing the relative positions of the specimen 717 and a terahertz wave pulse output from the changing unit 718, and information about the specimen 717 obtained by the information obtaining unit 720, so as to visualize the structure and optical characteristics of the specimen 717. The apparatus 700 is capable of obtaining a transmission image of the specimen 717 by detecting a terahertz wave that has transmitted through the specimen 717. Also, for example, a tomographic image or the like can be obtained by using a reflective measurement apparatus that detects a reflected terahertz wave.

If an image is formed by using the physical property of the specimen 717 obtained by the information obtaining unit 720, the shape of a region having a certain property of the specimen can be visualized. Specifically, the shape of the region is a shape of a region of the specimen 717 where the physical property value is the same or the physical property value is within a certain range. For example, in a case where a complex refractive index is obtained as a physical property of the specimen, a region where the complex refractive index is a certain value and another region may be displayed in different ways, for example, in different colors. Accordingly, the shape of the region having a certain physical property can be obtained. The type of information about the specimen to be obtained can be appropriately selected by a user.

The apparatus 700 having the above-described configuration monitors whether or not the device 104a is vibrating, and obtains a time waveform of a terahertz wave when the magnitude of the vibration becomes within the allowable range. Thus, an unnecessary waiting time can be shortened compared to the case of waiting for a certain period after vibration has been detected. According to the related art, obtainment of a time waveform may be started even if vibration continues after the certain period has elapsed. In contrast, in this embodiment, the occurrence of such a phenomenon can be suppressed. Thus, a decrease in accuracy of a time waveform caused by vibration can be easily suppressed, and also the period of time required to obtain a time waveform can be easily shortened.

While the present invention has been described with reference to exemplary embodiments, it is to be understood that the invention is not limited to the disclosed exemplary embodiments.

For example, the apparatus 400 according to the second embodiment and the apparatus 500 according to the third embodiment may be combined to obtain a measurement apparatus including the vibration applying unit 415 and the modulating unit 520. The apparatus 700 according to the fourth embodiment has the configuration of the measurement apparatus 100 according to the first embodiment. Alternatively, the apparatus 700 may have the configuration of the measurement apparatus according to the second or third embodiment. In this way, the configurations of various embodiments may be combined according to necessity. Furthermore, an embodiment of the present invention is applicable to an information obtaining apparatus that does not include the changing unit 718 and the image forming unit 719 of the apparatus 700, or an information obtaining apparatus that does not include the image forming unit 719.

The scope of the following claims is to be accorded the broadest interpretation so as to encompass all such modifications and equivalent structures and functions.

This application claims the benefit of Japanese Patent Application No. 2014-083134, filed Apr. 14, 2014, which is hereby incorporated by reference herein in its entirety.

What is claimed is:

1. A measurement apparatus for measuring a terahertz wave by using time-domain spectroscopy, comprising:
   a terahertz wave generating unit configured to generate the terahertz wave in response to incidence of pump light thereon;
   a terahertz wave detecting unit configured to detect the terahertz wave in response to incidence of probe light thereon;
   an adjusting unit configured to adjust an optical path length difference, which is a difference between an optical path length of the pump light and an optical path length of the probe light, and adjust a timing at which the terahertz wave and the probe light reach the terahertz wave detecting unit;
   an amount-of-change detecting unit configured to detect an amount of change in the optical path length difference;
   a vibration obtaining unit configured to obtain information about a magnitude of vibration of the adjusting unit by using a detection result generated by the amount-of-change detecting unit in a state where the adjusting unit is stationary;
   a determining unit configured to determine, by using the information, whether the magnitude of the vibration of the adjusting unit is within a range of an allowable value; and
   an output unit configured to output a measurement start trigger in a case where the determining unit determines that the magnitude of the vibration of the adjusting unit is within the range of the allowable value.

2. The measurement apparatus according to claim 1, further comprising:
   a driving unit configured to control a movement of the adjusting unit,
   wherein the driving unit starts moving the adjusting unit in response to receipt of the measurement start trigger.

3. The measurement apparatus according to claim 1, wherein the information represents an average value and a standard deviation of an amount of change in the optical path length difference detected per unit time by the amount-of-change detecting unit.

4. The measurement apparatus according to claim 1, wherein the information represents a total amount of change in the optical path length difference detected per unit time by the amount-of-change detecting unit.

5. The measurement apparatus according to claim 1, wherein the amount of change in the optical path length difference is an amount of movement of the adjusting unit.

6. The measurement apparatus according to claim 1, wherein the adjusting unit includes an optical device and a moving unit configured to move the optical device.

7. The measurement apparatus according to claim 6, further comprising:
   a stand on which the adjusting unit is disposed; and
   a vibration applying unit configured to apply vibration to the stand,
   wherein the vibration applying unit applies vibration so as to cancel out a force generated in accordance with a movement of the optical device.

8. The measurement apparatus according to claim 6, further comprising:
   a modulating unit configured to modulate at least one of a movement velocity, an acceleration, and a deceleration of the optical device in a case where a magnitude of vibration of the optical device is large.

9. An information obtaining apparatus for obtaining information about a specimen by irradiating the specimen with a terahertz wave, the information obtaining apparatus comprising:

the measurement apparatus according to claim 1; and an information obtaining unit configured to obtain the information about the specimen by using a measurement result generated by the measurement apparatus.

10. The information obtaining apparatus according to claim 9, further comprising:

a changing unit configured to change an irradiation position of the specimen irradiated with the terahertz wave.

11. The information obtaining apparatus according to claim 10, further comprising:

an image forming unit configured to form an image of the specimen by using the information about the specimen obtained by the information obtaining unit.

12. A measurement method for measuring a terahertz wave by using a measurement apparatus including a terahertz wave generating unit configured to generate the terahertz wave in response to incidence of pump light thereon, a terahertz wave detecting unit configured to detect the terahertz wave in response to incidence of probe light thereon, and an adjusting unit configured to adjust an optical path length difference, which is a difference between an optical path length of the pump light and an optical path length of the probe light, and adjust a timing at which the terahertz wave and the probe light reach the terahertz wave detecting unit, the measurement method comprising:

an amount-of-change detection step of detecting an amount of change in the optical path length difference in a state where the adjusting unit is stationary;

an obtaining step of obtaining information about a magnitude of vibration of the adjusting unit by using a detection result generated in the amount-of-change detection step;

a determination step of determining, by using the information, whether the magnitude of the vibration of the adjusting unit is within a range of an allowable value;

an output step of outputting a measurement start trigger in a case where the determination step determines that the magnitude of the vibration of the adjusting unit is within the range of the allowable value; and a terahertz wave detection step of detecting the terahertz wave in response to receipt of the measurement start trigger.

13. The measurement method according to claim 12, wherein the amount-of-change detection step detects an amount of change in the optical path length difference in each of a plurality of unit times, and the obtaining step statistically processes the amounts of change in the optical path length difference to obtain the information.

* * * * *